(12) United States Patent
Hulse

(10) Patent No.: US 9,379,537 B2
(45) Date of Patent: Jun. 28, 2016

(54) POWER SYSTEM INCLUDING A CIRCUIT PROVIDING SMART ZONE SELECTIVE INTERLOCKING COMMUNICATION

(71) Applicant: EATON CORPORATION, Cleveland, OH (US)

(72) Inventor: Robert Eugene Hulse, Wayne, ME (US)

(73) Assignee: EATON CORPORATION, Cleveland, OH (US)

( * ) Notice: Subject to any disclaimer, the term of this patent is extended or adjusted under 35 U.S.C. 154(b) by 439 days.

(21) Appl. No.: 14/058,434

(22) Filed: Oct. 21, 2013

(65) Prior Publication Data

US 2015/0112499 A1    Apr. 23, 2015

(51) Int. Cl.
  *G05D 3/12*     (2006.01)
  *H02H 7/30*     (2006.01)
  *H02H 7/26*     (2006.01)

(52) U.S. Cl.
  CPC *H02H 7/30* (2013.01); *H02H 7/262* (2013.01)

(58) Field of Classification Search
  CPC ... H01H 2071/665; H01H 9/26; H01H 33/48; H01H 2003/3057; H01H 2009/267; H01H 3/227; H01H 50/323; H01H 9/20; H01H 9/24; H02H 7/30
  See application file for complete search history.

(56) References Cited

U.S. PATENT DOCUMENTS

| | | | | | |
|---|---|---|---|---|---|
| 4,266,259 | A | * | 5/1981 | Howell | H02H 7/30 361/94 |
| 4,468,714 | A | * | 8/1984 | Russell | H02H 7/30 324/424 |
| 5,734,576 | A | * | 3/1998 | Klancher | H02H 7/30 324/424 |
| 5,875,088 | A | * | 2/1999 | Matsko | H02H 7/30 361/64 |
| 5,905,615 | A | * | 5/1999 | Rivetti | H02H 7/30 361/63 |
| 5,905,616 | A | * | 5/1999 | Lyke | H02H 7/30 307/39 |
| 6,297,939 | B1 | * | 10/2001 | Bilac | H02H 7/30 361/64 |
| 7,053,321 | B2 | * | 5/2006 | Leccia | H01H 1/365 200/50.01 |
| 7,053,570 | B2 | * | 5/2006 | Lathrop | H01H 3/26 318/258 |
| 7,570,465 | B2 | * | 8/2009 | Beatty, Jr. | H02H 9/00 361/42 |

(Continued)

*Primary Examiner* — Darrin Dunn
(74) *Attorney, Agent, or Firm* — Eckert Seamans Cherin & Mellott, LLC; Kirk D. Houser; Philip E. Levy

(57) ABSTRACT

A power system includes main circuit interrupters each having a load output, feeder circuit interrupters, a number of tie circuit interrupters, and a circuit. The circuit is structured to block communication, at least when at least one of the tie circuit interrupters has an open state between a first and a second of the main circuit interrupters, of a zone selective interlocking output of one of the feeder circuit interrupters having a line input electrically connected to the load output of the first main circuit interrupter to a zone selective interlocking input of the second main circuit interrupter, and of a zone selective interlocking output of a different one of the feeder circuit interrupters having a line input electrically connected to the load output of the second main circuit interrupter to a zone selective interlocking input of the first main circuit interrupter.

23 Claims, 5 Drawing Sheets

(56) References Cited

U.S. PATENT DOCUMENTS

| | | | | |
|---|---|---|---|---|
| 7,598,468 B2* | 10/2009 | Chen | H01H 71/44 | 200/400 |
| 7,615,888 B2* | 11/2009 | Lathrop | H02J 3/14 | 307/64 |
| 8,280,653 B2* | 10/2012 | Lagree | H02H 7/30 | 361/63 |
| 8,514,531 B1* | 8/2013 | Zhou | H02H 7/30 | 361/42 |
| 8,521,454 B2* | 8/2013 | Lagree | H02H 7/30 | 361/63 |
| 8,649,147 B2* | 2/2014 | Schlotterer | H01H 71/123 | 361/115 |
| 8,766,489 B2* | 7/2014 | Lathrop | H02J 3/06 | 307/125 |
| 2003/0231440 A1* | 12/2003 | Papallo | G06F 1/12 | 361/3 |
| 2003/0231447 A1* | 12/2003 | Papallo | G06F 1/12 | 361/72 |
| 2005/0219775 A1* | 10/2005 | Shipp | H02H 9/00 | 361/5 |
| 2006/0221533 A1* | 10/2006 | Lathrop | H02J 3/14 | 361/160 |
| 2007/0121268 A1* | 5/2007 | Terhorst | H01H 71/62 | 361/115 |
| 2007/0183111 A1* | 8/2007 | Carlino | H02H 3/093 | 361/115 |
| 2007/0242402 A1* | 10/2007 | Papallo | G06F 1/12 | 361/63 |
| 2008/0158753 A1* | 7/2008 | Premerlani | H02H 7/30 | 361/80 |
| 2008/0198521 A1* | 8/2008 | Weiher | H02H 7/262 | 361/64 |
| 2009/0257158 A1* | 10/2009 | Vicente | H02H 7/30 | 361/42 |
| 2010/0038966 A1* | 2/2010 | Espeut, Jr. | H01H 9/26 | 307/68 |
| 2010/0204933 A1* | 8/2010 | Lagree | H02H 7/30 | 702/58 |
| 2011/0282507 A1* | 11/2011 | Oudalov | H04B 3/54 | 700/292 |
| 2012/0279833 A1* | 11/2012 | Meyer-Haack | H01H 9/26 | 200/50.32 |
| 2012/0310429 A1* | 12/2012 | Vicente | H02H 7/30 | 700/292 |
| 2012/0316805 A1* | 12/2012 | Lagree | H02H 7/30 | 702/58 |
| 2013/0024039 A1* | 1/2013 | Gotz | H02H 7/30 | 700/292 |
| 2013/0315610 A1* | 11/2013 | Utagawa | G03G 15/607 | 399/21 |
| 2015/0162741 A1* | 6/2015 | Valdes | H02H 7/263 | 361/87 |

* cited by examiner

POWER SYSTEM INCLUDING A CIRCUIT PROVIDING SMART ZONE SELECTIVE INTERLOCKING COMMUNICATION

BACKGROUND

1. Field

The disclosed concept pertains generally to power systems and, more particularly, to power systems, such as, for example, main-tie-main power systems employing zone selective interlocking communication.

2. Background Information

Zone selective interlocking (ZSI) allows for coordinated communication between circuit breakers or other overcurrent protection devices. This allows for circuit breakers to communicate during observed fault incidences, allowing for faster response times on clearing a fault. In order to effectively use ZSI, circuit breakers are divided into zones based on location relative to a main protective device, which is in a first zone. By decreasing tripping delays, ZSI significantly increases the protective ability of protection system.

For example, in a typical ZSI arrangement, if a lower order circuit breaker of the ZSI hierarchy sees an overload current, it sends an interlock signal to the next higher order device to block generation of an instantaneous trip signal by the latter and to give the former time to react. This permits adjacent circuit breakers in the ZSI hierarchy to have their overcurrent/time trip characteristics set to achieve normal time-current coordination for faults supplied by the lower order circuit breaker, yet allow the higher order circuit breaker to trip without delay for faults between the higher order and lower order circuit breakers.

For example, zone interlocking can be provided on both phase and ground protection, if enabled. As a non-limiting example, ground and short delay interlocking functions can be combined on one common set of connections. So, for example, a restraint or zone interlock output signal (ZONE_OUT or ZOUT) is enabled when a fault: (1) exceeds the ground fault setting of the circuit breaker; or (2) is greater than two times the rated current value of the electrical current of the circuit breaker.

ZSI employs a priority process. The main goal is to clear a fault "instantaneously" (i.e., an instantaneous trip as is understood by persons of ordinary skill in the art), regardless of where the fault is in the system, but keep power to the rest of the system, if possible. In order to do this, the circuit breaker in the furthest downstream zone that recognizes the fault will send a restraint signal to the upstream zone and attempt to clear the fault by opening. As a fail-safe, however, the upstream circuit breakers of the upstream zone will begin their normal time out delay, and once timed out, will attempt to clear the fault if the downstream zone fails to clear it. However, if there is a fault on the load side of an upstream zoned circuit breaker, then that circuit breaker will not receive a restraint signal, and will trip instantaneously instead of waiting for its time out delay in order to allow it to open and clear the fault. This significantly increases the safety of the system and decreases the damage caused by the fault.

U.S. Pat. No. 5,875,088 discloses three zones and ZONE_IN and ZONE_OUT signals. A main circuit breaker of a first zone supplies two feeder circuit breakers of a second zone. One of the feeder circuit breakers also acts as a main circuit breaker for two downstream devices of a third zone.

ZSI for power circuit breakers in low voltage power systems greatly increases safety and decreases damage to the system caused by, for example, a ground fault. While extremely effective, ZSI, in use, is limited in its ability to react instantly to a fault on the load side of a main circuit breaker of one side of a Main-Tie-Main power system with an open tie circuit breaker, while a simultaneous and independent fault occurs on the feeder of the other side of the tie circuit breaker. Known ZSI communications allow for undesired communication between feeder circuit breakers or protective devices on one side of an open tie circuit breaker to cause undesired delayed tripping of the main circuit breaker or protective device on the opposite side of the open tie circuit breaker. This decreases the effectiveness of the system in quickly clearing the fault on the load side of the main circuit breaker within the protection zone of the interlocked system.

Referring to FIGS. 1A and 1B, a double-ended substation employs a single blocking diode D to prevent a tie circuit breaker T from "self interlocking" while allowing it to provide an interlocking signal to both main circuit breakers M1,M2. The single diode D is electrically connected from the zone input (anode) to the zone output (cathode) of the tie circuit breaker T. However, the configuration of FIG. 1A also allows all of the feeder circuit breakers F1,F2 to communicate with the tie circuit breaker T and both main circuit breakers M1,M2 at the same time as the tie circuit breaker T. The presence of the tie circuit breaker T creates a problem since it must provide a ZOUT signal to multiple upstream devices (including the main circuit breakers M1,M2), and each of those upstream devices M1,M2 is allowed to receive ZOUT signals from downstream feeders F1,F2 (through the diode D) that should not communicate across the tie circuit breaker T (i.e., the left feeder F1 should not communicate with the right main circuit breaker M2 and the right feeder F2 should not communicate with the left main circuit breaker M1.

There is room for improvement in power systems.

SUMMARY

These needs and others are met by embodiments of the disclosed concept in which a power system comprises: a plurality of main circuit interrupters, each of the main circuit interrupters including: a line input, a load output, and a zone selective interlocking input; a number of tie circuit interrupters, at least one of the number of tie circuit interrupters including: a first terminal electrically connected to the load output of a first one of the main circuit interrupters, a second terminal electrically connected to the load output of a different second one of the main circuit interrupters, separable contacts electrically connected between the first terminal and the second terminal, the separable contacts having an open state and a closed state, a zone selective interlocking input, and a zone selective interlocking output; a plurality of feeder circuit interrupters, each of the feeder circuit interrupters including: a line input electrically connected to the load output of one of the main circuit interrupters, a load output, and a zone selective interlocking output; and a circuit structured to block communication, at least when the at least one of the number of tie circuit interrupters has the open state, of the zone selective interlocking output of one of the feeder circuit interrupters having the line input electrically connected to the load output of the first one of the main circuit interrupters to the zone selective interlocking input of the different second one of the main circuit interrupters, and of the zone selective interlocking output of a different one of the feeder circuit interrupters having the line input electrically connected to the load output of the different second one of the main circuit interrupters to the zone selective interlocking input of the first one of the main circuit interrupters.

The circuit may comprise: a first diode including an anode electrically connected to the zone selective interlocking output of the at least one of the number of tie circuit interrupters and a cathode electrically connected to the zone selective interlocking input of the first one of the main circuit interrupters; a second diode including an anode electrically connected to the zone selective interlocking output of the at least one of the number of tie circuit interrupters and a cathode electrically connected to the zone selective interlocking input of the different second one of the main circuit interrupters; a third diode including an anode electrically connected to the zone selective interlocking output of the one of the feeder circuit interrupters and a cathode electrically connected to the zone selective interlocking input of the first one of the main circuit interrupters; a fourth diode including an anode electrically connected to the zone selective interlocking output of the one of the feeder circuit interrupters and a cathode electrically connected to the zone selective interlocking input of the at least one of the number of tie circuit interrupters; a fifth diode including an anode electrically connected to the zone selective interlocking output of the different one of the feeder circuit interrupters and a cathode electrically connected to the zone selective interlocking input of the different second one of the main circuit interrupters; and a sixth diode including an anode electrically connected to the zone selective interlocking output of the different one of the feeder circuit interrupters and a cathode electrically connected to the zone selective interlocking input of the at least one of the number of tie circuit interrupters.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "connected" or "coupled" together shall mean that the parts are joined together either directly or joined through one or more intermediate parts. Further, as employed herein, the statement that two or more parts are "attached" shall mean that the parts are joined together directly.

The disclosed concept is described in association with circuit breakers, although the disclosed concept is applicable to circuit interrupters.

Figure 1A:
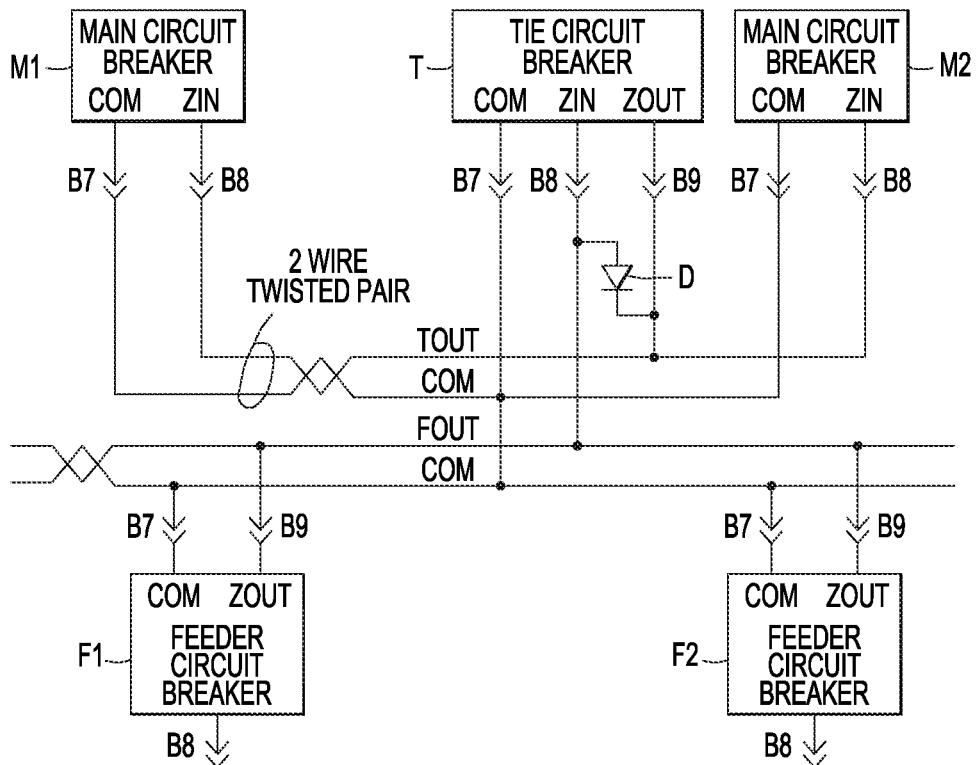
FIG. 1A is a block diagram of a power system including zone selective interlocking between two main circuit breakers, a tie circuit breaker and two feeder circuit breakers.
Figure 1B:
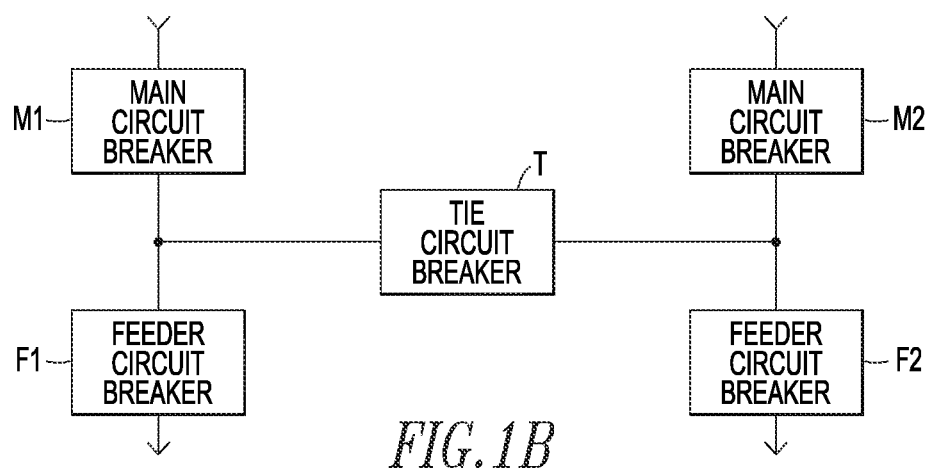
FIG. 1B is a block diagram of the power system of FIG. 1A showing the power bus connections between the two main circuit breakers, the tie circuit breaker and the two feeder circuit breakers.
Figure 2:
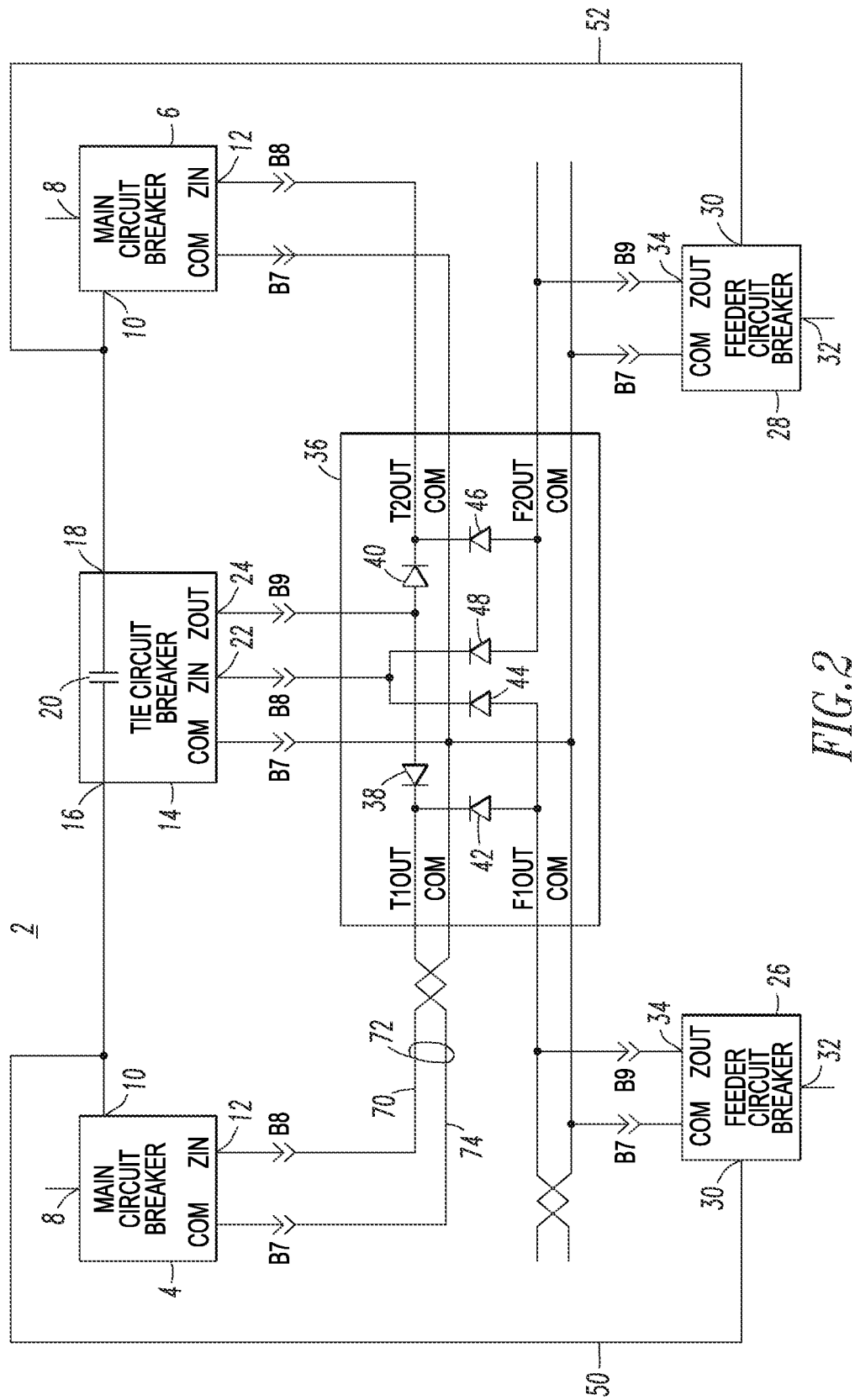
FIG. 2 is a block diagram of a power system including a circuit and zone selective interlocking between two main circuit breakers, a tie circuit breaker and two feeder circuit breakers in accordance with embodiments of the disclosed concept.

The disclosed concept is described in association with a two layer, four zone power system of low voltage switchgear, although the disclosed concept is applicable to a wide range of power systems including, for example and without limitation, six or more zones and/or medium voltage equipment. For example, low voltage equipment employs circuit breaker trip units, while protective relays, which have a similar Zone Selective Interlocking (ZSI) capability, are typically associated with medium voltage circuit breakers and equipment. Referring to FIG. 2, with the tie circuit breaker (CB) 14 open, there are two separate two zone systems where in one system main CB 4 and feeder CB 26 form the "left upper" (with respect to FIG. 2) zone, downstream of feeder CB 26 is the "left lower" (with respect to FIG. 2) zone; and in the other system main CB 6 and feeder CB 28 form the "upper right" (with respect to FIG. 2) zone, and downstream of feeder CB 28 is the "lower right" (with respect to FIG. 2) zone. When the tie CB 14 is closed, it becomes a single power system with four zones, except that the upper (with respect to FIG. 2) zones may include a feeder and both a main and the tie, or a feeder and the tie only, depending on whether both mains are closed, or just one main is closed.

Continuing to refer to FIG. 2, a power system 2 includes a plurality of main circuit interrupters (e.g., without limitation, main circuit breakers (CBs) 4,6), each of which includes a line input 8, a load output 10, and a zone selective interlocking input 12. The power system 2 also includes a number of tie circuit interrupters (e.g., without limitation, one tie CB 14 is shown). The example tie CB 14 includes a first terminal 16 electrically connected to the load output 10 of main CB 4, a second terminal 18 electrically connected to the load output 10 of main CB 6, separable contacts 20 electrically connected between the first and second terminals 16,18, a zone selective interlocking input 22, and a zone selective interlocking output 24. The separable contacts 20 have an open state (as shown) and a closed state (not shown). The power system 2 further includes a plurality of feeder circuit interrupters (e.g., without limitation, feeder CBs 26,28), each of which includes a line input 30 electrically connected to the load output 10 of one of the main CBs 4,6, a load output 32, and a zone selective interlocking output 34.

For example and without limitation, the example tie CB 14 normally has the open state of the separable contacts 20 between the first and second terminals 16,18 thereof.

In accordance with the disclosed concept, the power system 2 includes a circuit 36 structured to block ZSI communication, at least when the tie CB 14 has the open state, of the zone selective interlocking output 34 of feeder CB 26 having the line input 30 electrically connected to the load output 10 of the main CB 4 to the zone selective interlocking input 12 of the other main CB 6, and of the zone selective interlocking output 34 of the other feeder CB 28 having the line input 30 electrically connected to the load output 10 of the other main CB 6 to the zone selective interlocking input 12 of the main CB 4.

As will be described, the ZSI communication is broken up by the use of the example circuit 36 (e.g., without limitation, including a plurality of blocking diodes 38,40,42,44,46,48) in order that separate interlocking zones are created, thereby preventing undesired cross communication between interlocked zones. In the example of FIG. 2, an improved ZSI system employs the six example diodes 38,40,42,44,46,48 to accomplish the ZSI communication function, but also segregates the communication such that the feeder CBs 26,28 can no longer directly interlock to the main CBs 6,4, respectively, on the opposite side of the tie CB 14. This reconfigures the ZSI communication between upstream and downstream tripping devices in order to eliminate "cross talk" between the ZOUT (or ZONE_OUT) signal of the feeder CB, such as 26, on one power bus 50 and the ZIN (or ZONE_IN) signal to the main CB, such as 6, on the opposite power bus 52. By separating the two sides of the main and feeder networks, this prevents the restraint signal sent from the feeder CB, such as 28, on one side from interfering with the main CB, such as 4, of the opposite side when not necessary. While not very likely, it is still a serious issue.

The example ZSI system configuration includes the two main CBs 4,6, the tie CB 14, and two or more feeder CBs, such as 26,28. However, it will be appreciated that the disclosed ZSI system is intended to be applied in a tiered cascade to as many levels as are practical to a particular application. The disclosed concept is applicable to any single tier having one or more tie CBs. The vast majority of main-tie-main power systems use only a single tier system, as shown, with a single tie CB splitting that tier into two zones. However, it is possible to have more than two zones on any given tier (e.g., without limitation, more than two main CBs and more than one tie CB). In those cases, diodes, such as 38,40,42,44,46, 48, are configured around each tie CB in a similar fashion to what is shown in FIG. 2 for the single tie CB 14. It is also possible to have more than one tier and have tie CBs on any tier, in which case each tie CB can be addressed with a similar diode arrangement.

Functionally, the disclosed ZSI communication is a simple "presence of voltage" system. For example, ZOUT is high true whenever the associated circuit breaker is detecting a ground fault above pick-up or current above two times the trip rating. The disclosed concept employs the example diodes 38,40,42,44,46,48 as a passive mechanism to break up a communication tier with the intent being to prevent a signal from crossing from one power bus feeder to the opposite main CB, thereby allowing the feeders to send blocking signals only to the main CB or tie CB from which they are directly supplied. Since cross communication is only a problem when the tie CB 14 is open between the power busses 50,52 of the two main CBs 4,6, it would be possible to use a number of auxiliary contacts on the tie CB 14 to switch the ZSI communication based on the tie CB 14 open or closed status as will be discussed, below, in connection with FIGS. 3-12.

In FIG. 2, the various CBs 4,6,14,26,28 are conventional and employ ZONE_IN and ZONE_OUT signals. B8 is ZONE_IN or ZIN, and B9 is ZONE_OUT or ZOUT. B7 is the common (COM) for ZSI and some other functions of the CB trip unit (not shown). As part of the example circuit 36, the first diode 38 includes an anode electrically connected to the zone selective interlocking output 24 (B9) of the tie CB 14 and a cathode electrically connected to the zone selective interlocking input 12 (B8) of the main CB 4. The second diode 40 includes an anode electrically connected to the zone selective interlocking output 24 (B9) of the tie CB 14 and a cathode electrically connected to the zone selective interlocking input 12 (B8) of the other main CB 6. The third diode 42 includes an anode electrically connected to the zone selective interlocking output 34 (B9) of the feeder CB 26 and a cathode electrically connected to the zone selective interlocking input 12 (B8) of the main CB 4. The fourth diode 44 includes an anode electrically connected to the zone selective interlocking output 34 of the feeder CB 26 and a cathode electrically connected to the zone selective interlocking input 22 of the tie CB 14. The fifth diode 46 includes an anode electrically connected to the zone selective interlocking output 34 of the feeder CB 28 and a cathode electrically connected to the zone selective interlocking input 12 of the other main CB 6. The sixth diode 48 includes an anode electrically connected to the zone selective interlocking output 34 of the feeder CB 28 and a cathode electrically connected to the zone selective interlocking input 22 of the tie CB 14.

As shown in FIGS. 3-12, the problem addressed by the disclosed concept is the blocking of cross communication (e.g., F1OUT to T2OUT, and F2OUT to T1OUT) when the tie circuit breaker 14 is open.

Figure 3:
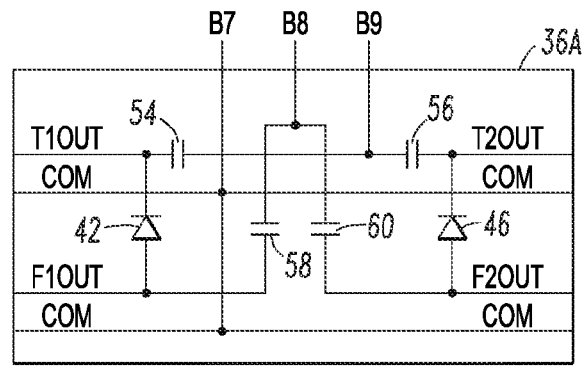
FIGS. 3-12 are block diagrams of circuits for the power system of FIG. 2 in accordance with other embodiments of the disclosed concept.

In FIG. 3, the example auxiliary contacts 54,56 perform a redundant function; opening either will isolate T1OUT from T2OUT when the tie CB 14 (FIG. 2) is open. The example auxiliary contacts 58,60 also perform a redundant function; opening either will isolate F1OUT from F2OUT when the tie CB 14 is open. Because of the two (F1OUT to T1OUT and F2OUT to T2OUT) communication paths, opening the tie CB 14 must isolate both communication paths: F1OUT from F2OUT, and T1OUT from T2OUT.

FIGS. 3-12 show examples of other circuits 36A-36J that can be used in place of the circuit 36 for the power system 2 of FIG. 2. In place of the example diodes 38,40,42,44,46,48, the example circuits 36A-36J employ two or four diodes, one, two or four auxiliary contacts, and zero, one or two suitable electrical connections (e.g., without limitation, "shorts") as will be described. In each of the example circuits 36A-36J, for simplicity of illustration, the electrical connections B7 (COM), B8 (ZIN or zone selective interlocking input 22) and B9 (ZOUT or zone selective interlocking output 24) of the tie CB 14 are shown. Also, in each of the example circuits 36A-36J, for simplicity of illustration, the common (COM) or B7 of the CBs 4,6,14,26,28 is shown, the ZOUT or zone selective interlocking output 34 of the feeder CB 26 is shown as F1OUT, the ZOUT or zone selective interlocking output 34 of the feeder CB 28 is shown as F2OUT, the ZOUT or zone selective interlocking output 24 of the tie CB 14 to the main CB 4 is shown as T1OUT, and the ZOUT or zone selective interlocking output 24 of the tie CB 14 to the main CB 6 is shown as T2OUT. Also, the state of the various auxiliary contacts, such as 54 of FIG. 3, is shown as open which corresponds to the open state of the separable contacts 20 of the tie CB 14.

The circuit 36A of FIG. 3 employs the diodes 42,46 of FIG. 2 along with auxiliary contacts 54,56,58,60 in place of the respective diodes 38,40,44,48. Each of the auxiliary contacts 54,56,58,60 is an auxiliary contact operated by the operating mechanism (not shown) of the associated tie CB 14 that is closed when the main separable contacts 20 (FIG. 2) are closed and open when those main separable contacts are open.

Figure 4:
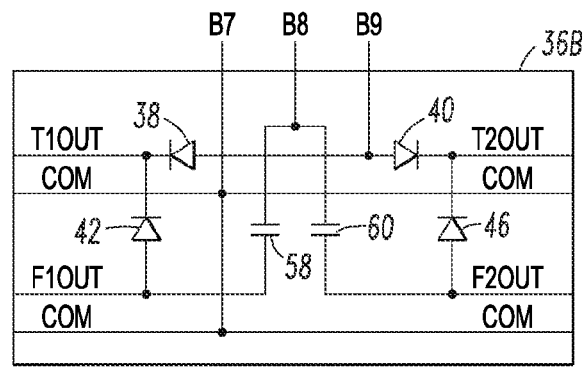

The circuit 36B of FIG. 4 employs the diodes 38,40,42,46 of FIG. 2 along with the auxiliary contacts 58,60 in place of the respective diodes 44,48.

Figure 5:
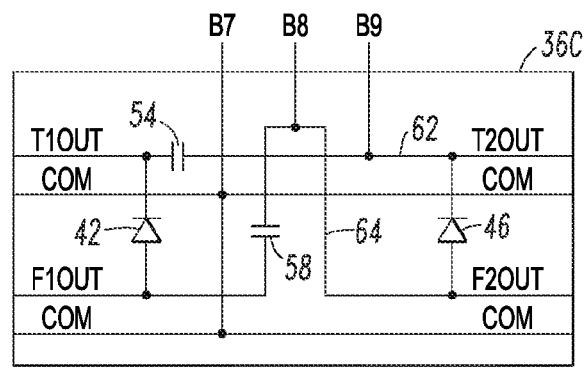

FIGS. 5-8 are circuits 36C-36F derived from the circuit 36A of FIG. 3. The circuit 36C of FIG. 5 employs the diodes 42,46 of FIG. 2 along with the auxiliary contacts 54,58 in place of the respective diodes 38,44. Also, the diodes 40,48 are replaced by electrical connections (e.g., without limitation, "shorts" 62,64). In FIG. 5, only the "left" (with respect to FIGS. 3 and 5) auxiliary contacts 54,58 are applied and the "right" (with respect to FIGS. 3 and 5) auxiliary contacts 56,60 are replaced with the example respective "shorts" 62,64. With the tie CB 14 open, the auxiliary contact 54 isolates F1OUT from T2OUT, and F2OUT from T1OUT by isolating T1OUT from T2OUT. The auxiliary contact 54 also happens to isolate F1OUT from ZOUT 24 (B9) of the tie CB 14, while F2OUT is not isolated from ZOUT 24 (B9) of the tie CB 14. Similarly, with the tie CB 14 open, the auxiliary contact 58 isolates F1OUT from T2OUT, and F2OUT from T1OUT by isolating F1OUT from F2OUT. The auxiliary contact 58 also happens to isolate F1OUT from ZIN 22 (B8) of the tie CB 14, while F2OUT is not isolated from ZIN 22 (B8) of the tie CB 14. The connection or isolation of either F1OUT or F2OUT to ZIN 22 (B8) of the tie CB 14, or T1OUT or T2OUT to ZOUT 24 (B9) of the tie CB 14 is of no consequence because the tie CB 14 is open, and hence, it does not see any current and is not subject to any tripping operation where the zone interlocking system is active. When the tie CB 14 is closed, there will be cross communication between F1OUT and T2OUT and F2OUT and T1OUT, but that is insignificant because the power busses 50,52 (FIG. 2) are tied by the closed tie CB 14 in order that a fault that impacts one of the power busses 50,52 impacts the other one of those power busses 50,52.

Figure 6:
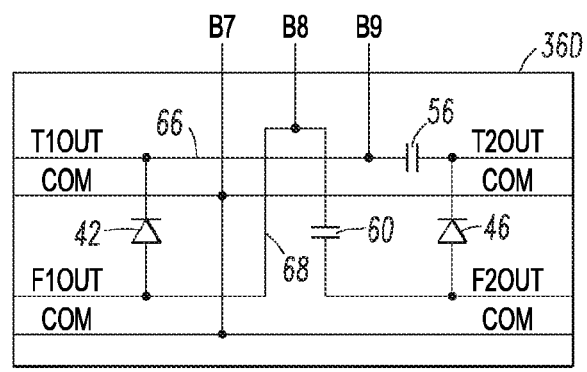

The circuit 36D of FIG. 6 reverses the situation from FIG. 5 and applies the "right" (with respect to FIGS. 3 and 6) auxiliary contacts 56,60 and "shorts" 66,68 the "left" (with respect to FIGS. 3, 5 and 6) auxiliary contacts 54,58 (FIG. 5). The circuit 36D employs the diodes 42,46 of FIG. 2 along with the auxiliary contacts 56,60 in place of the respective diodes 40,48. Also, the diodes 38,44 are replaced by electrical connections (e.g., without limitation, "shorts" 66,68).

Figure 7:
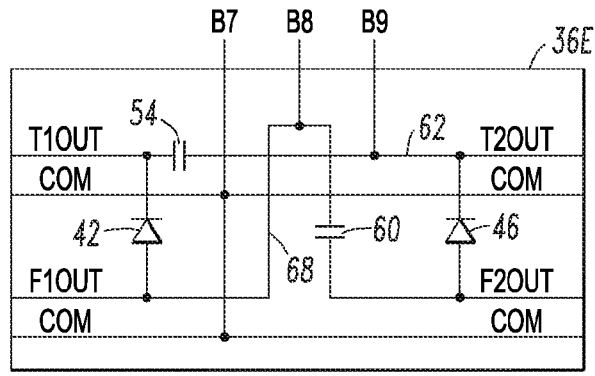

The circuit 36E of FIG. 7 applies the "left" (with respect to FIGS. 3 and 7) auxiliary contact 54 and the "right" (with respect to FIGS. 3 and 7) auxiliary contact 60, such that the desired isolation of F1OUT from T2OUT and F2OUT from T1OUT is achieved, but with T1OUT isolated from ZOUT 24 (B9) of the tie CB 14 and F2OUT isolated from ZIN 22 (B8) of the tie CB 14. The circuit 36E employs the diodes 42,46 of FIG. 2 along with the auxiliary contacts 54,60 in place of the respective diodes 38,48. Also, the diodes 40,44 are replaced by electrical connections (e.g., without limitation, "shorts" 62,68).

Figure 8:
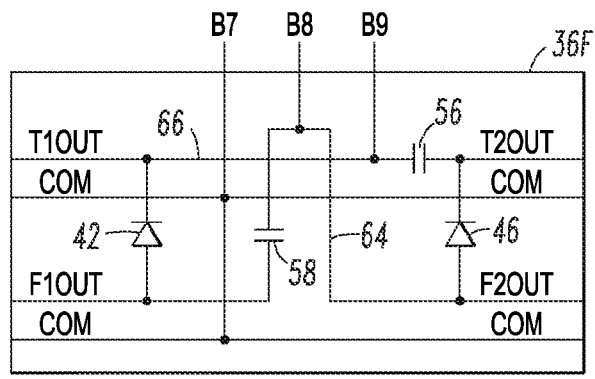
Figure 9:
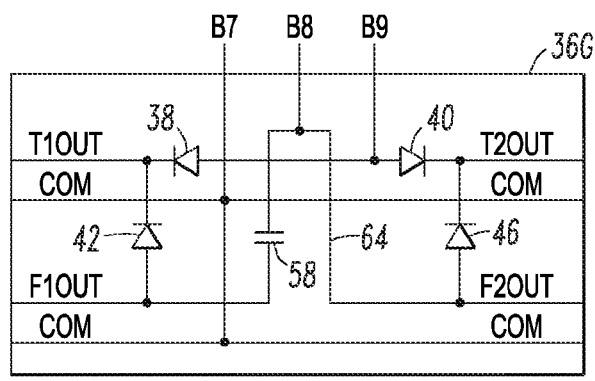
Figure 10:
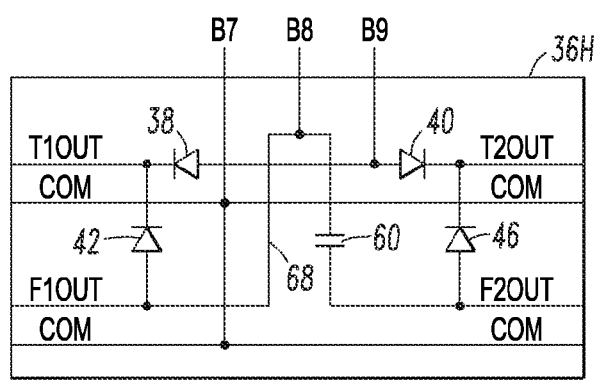

The circuit 36F of FIG. 8 applies the "left" (with respect to FIGS. 3 and 8) auxiliary contact 58 and the "right" (with respect to FIGS. 3 and 8) auxiliary contact 56 in order to provide the desired isolation across the tie CB 14 (FIG. 2), with the mirror isolation with respect to FIG. 7 of the signals from the tie CB 14. The circuit 36F employs the diodes 42,46 of FIG. 2 along with the auxiliary contacts 56,58 in place of the respective diodes 40,44. Also, the diodes 38,48 are replaced by electrical connections (e.g., without limitation, "shorts" 66,64).

FIGS. 9-12 are circuits 36G-36J which are derived from the circuit 36 of FIG. 2 or from the circuit 36A of FIG. 3. In these circuits, the function of either one of the auxiliary contacts 54 or 56 from circuit 36A is replaced with a pair of diodes in order to provide bi-directional isolation. The circuit 36G of FIG. 9 employs the diodes 38,40,42,46 of FIG. 2 along with the auxiliary contact 58 in place of the diode 44 and an electrical connection (e.g., without limitation, "short" 64) in place of the diode 48. The circuit 36H of FIG. 10 also employs the diodes 38,40,42,46 of FIG. 2 along with the auxiliary contact 60 in place of the diode 48 and an electrical connection (e.g., without limitation, "short" 68) in place of the diode 44.

Figure 11:
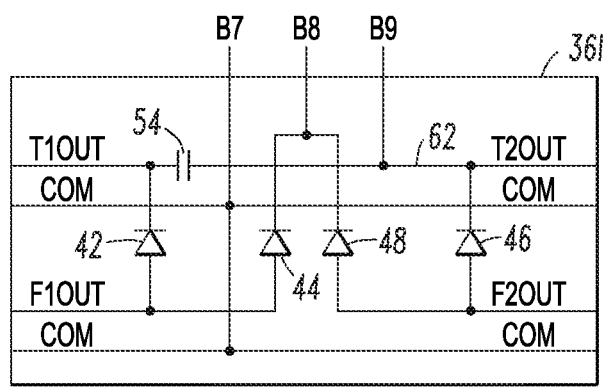
Figure 12:
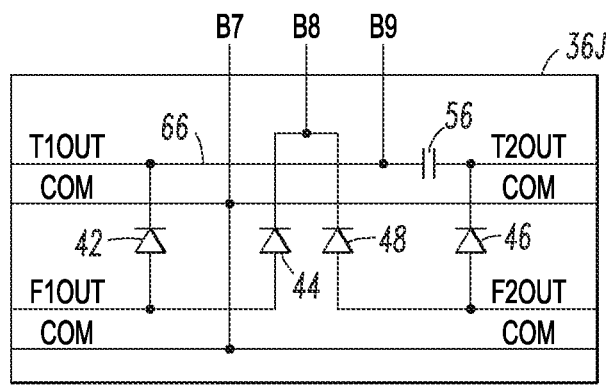

The circuit 36I of FIG. 11 employs the diodes 42,44,46,48 of FIG. 2 along with the auxiliary contact 54 in place of the diode 38 and an electrical connection (e.g., without limitation, "short" 62) in place of the diode 40. The circuit 36J of FIG. 12 also employs the diodes 42,44,46,48 of FIG. 2 along with the auxiliary contact 56 in place of the diode 40 and an electrical connection (e.g., without limitation, "short" 66) in place of the diode 38.

In FIGS. 5-12, the asymmetry of the circuit arrangement relative to the tie CB 14 (FIG. 2) is not an issue.

In FIG. 2, the main CBs 4,6, the number of tie CBs 14, and the feeder CBs 26,28 can be, for example and without limitation, low voltage switchgear.

In FIG. 2, the diodes 38,40,42,44,46,48 of the example circuit 36 can be, for example and without limitation, discrete diodes. Such discrete diodes and the example circuit 36 can be within a common enclosure, on a printed circuit board, or within an integrated circuit.

For example, the second and fourth diodes 40,44 are structured to eliminate communication between the zone selective interlocking output 34 of the feeder CB 28 on the power bus 52 powered by the main CB 6 and the other main CB 4 that powers the different power bus 50 for the other feeder CB 26. For example, the second and fourth diodes 40,44 prevent the zone selective interlocking output 34 of the feeder CB 28 on the power bus 52 powered by the main CB 6 from being input by the zone selective interlocking input 12 of the main CB 4 that powers the different power bus 50 for the other feeder CB 26.

For example and without limitation, in FIG. 2, the first and second diodes 38,40 are electrically connected together in series with a first conductor 70 of a two-wire twisted pair 72. The first conductor 70 is then electrically connected to the zone selective interlocking input 12 (B8) of the first main CB 4. The second conductor 74 of the two-wire twisted pair 72 is electrically connected to a ground or common (COM) (B7). Each of the main CBs 4,6, the number of tie CBs 14, and the feeder CBs 26,28 further includes a terminal (B7) (COM) electrically connected to the second conductor 74 of the two-wire twisted pair 72.

A number of non-limiting example tests can be performed using secondary current simulations that eliminate all the effects of fault impedance and assume a single line-to-ground fault on the same phase. These non-limiting tests are intended to validate the function, but not describe the function or benefit. Regardless, in accordance with the disclosed concept, when the tie CB 14 is open, and there is a bus fault on one side and a feeder fault on the other side, the main CB supplying the bus fault is allowed to trip instantaneously without being delayed. The following non-limiting example test illustrates a functional benefit of the disclosed concept.

For a fault on the load of feeder CB 26 and a fault on the load of the main CB 6, the tie CB 14, in this case, would be open. The expected results are for the feeder CB 26 to recognize a ground fault on its load, send a restraint signal (F1OUT) to the open tie CB 14 as well as to the main CB 4. The feeder CB 26 should then open after a predetermined feeder ground fault trip delay (e.g., without limitation, 0.1 second delay) while the main CB 4 remains closed. At the same time, the main CB 6 will see a similar (but different) fault on its load and, not receiving a restraint signal, will nearly open instantly (e.g., without limitation, a suitable "instantaneous" trip delay of about 0.045 seconds) to clear the ground fault.

The disclosed concept is able to separate the different sides of the example Main-Tie-Main power system 2 from interfering with each other during a double fault condition, which is a significant problem with prior proposals. This actively separates the two sides of the Main-Tie-Main power system 2, thereby eliminating undesired delay in tripping of one of the main CBs 4,6 due to a restraint signal (F1OUT or F2OUT) from a feeder CB on the respective opposite power bus 52,50.

Although discrete diodes 38,40,42,44,46,48 are disclosed as part of the example circuit 36, alternatively, a suitably packaged diode system, employing either discrete devices on a printed circuit board or an integrated semiconductor bridge, could simplify installation of such a circuit in a high volume application. For example, a suitable circuit enclosure can house or functionally replace these discrete diodes with an integrated circuit.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A power system comprising:
a plurality of main circuit interrupters, each of said main circuit interrupters including:
a line input,
a load output, and
a zone selective interlocking input;
a number of tie circuit interrupters, at least one of said number of tie circuit interrupters including:
a first terminal electrically connected to the load output of a first one of said main circuit interrupters,
a second terminal electrically connected to the load output of a different second one of said main circuit interrupters,
separable contacts electrically connected between said first terminal and said second terminal, said separable contacts having an open state and a closed state,
a zone selective interlocking input, and
a zone selective interlocking output;
a plurality of feeder circuit interrupters, each of said feeder circuit interrupters including:
a line input electrically connected to the load output of one of said main circuit interrupters,
a load output, and
a zone selective interlocking output; and
a circuit structured to block communication, at least when said at least one of said number of tie circuit interrupters has the open state, of the zone selective interlocking output of one of the feeder circuit interrupters having the line input electrically connected to the load output of said first one of said main circuit interrupters to the zone selective interlocking input of said different second one of said main circuit interrupters, and of the zone selective interlocking output of a different one of the feeder circuit interrupters having the line input electrically connected to the load output of said different second one of said main circuit interrupters to the zone selective interlocking input of said first one of said main circuit interrupters.

2. The power system of claim 1 wherein said circuit comprises:
a first diode including an anode electrically connected to the zone selective interlocking output of said at least one of said number of tie circuit interrupters and a cathode electrically connected to the zone selective interlocking input of said first one of said main circuit interrupters;
a second diode including an anode electrically connected to the zone selective interlocking output of said at least one of said number of tie circuit interrupters and a cathode electrically connected to the zone selective interlocking input of said different second one of said main circuit interrupters;
a third diode including an anode electrically connected to the zone selective interlocking output of said one of said feeder circuit interrupters and a cathode electrically connected to the zone selective interlocking input of said first one of said main circuit interrupters;
a fourth diode including an anode electrically connected to the zone selective interlocking output of said one of said feeder circuit interrupters and a cathode electrically connected to the zone selective interlocking input of said at least one of said number of tie circuit interrupters;
a fifth diode including an anode electrically connected to the zone selective interlocking output of said different one of said feeder circuit interrupters and a cathode electrically connected to the zone selective interlocking input of said different second one of said main circuit interrupters; and
a sixth diode including an anode electrically connected to the zone selective interlocking output of said different one of said feeder circuit interrupters and a cathode electrically connected to the zone selective interlocking input of said at least one of said number of tie circuit interrupters.

3. The power system of claim 1 wherein said circuit comprises:
a first auxiliary contact having a state corresponding to the open state or the closed state of said separable contacts and electrically connected between the zone selective interlocking output of said at least one of said number of tie circuit interrupters and the zone selective interlocking input of said first one of said main circuit interrupters;
a second auxiliary contact having said state corresponding to the open state or the closed state of said separable contacts and electrically connected between the zone selective interlocking output of said at least one of said number of tie circuit interrupters and the zone selective interlocking input of said different second one of said main circuit interrupters;
a first diode including an anode electrically connected to the zone selective interlocking output of said one of said feeder circuit interrupters and a cathode electrically connected to the zone selective interlocking input of said first one of said main circuit interrupters;
a third auxiliary contact having said state corresponding to the open state or the closed state of said separable contacts and electrically connected between the zone selective interlocking output of said one of said feeder circuit interrupters and the zone selective interlocking input of said at least one of said number of tie circuit interrupters;
a second diode including an anode electrically connected to the zone selective interlocking output of said different one of said feeder circuit interrupters and a cathode electrically connected to the zone selective interlocking input of said different second one of said main circuit interrupters; and
a fourth auxiliary contact having said state corresponding to the open state or the closed state of said separable contacts and electrically connected between the zone selective interlocking output of said different one of said feeder circuit interrupters and the zone selective interlocking input of said at least one of said number of tie circuit interrupters.

4. The power system of claim 1 wherein said circuit comprises:
a first diode including an anode electrically connected to the zone selective interlocking output of said at least one of said number of tie circuit interrupters and a cathode electrically connected to the zone selective interlocking input of said first one of said main circuit interrupters;
a second diode including an anode electrically connected to the zone selective interlocking output of said at least one of said number of tie circuit interrupters and a cathode electrically connected to the zone selective interlocking input of said different second one of said main circuit interrupters;
a third diode including an anode electrically connected to the zone selective interlocking output of said one of said feeder circuit interrupters and a cathode electrically connected to the zone selective interlocking input of said first one of said main circuit interrupters;
a first auxiliary contact having a state corresponding to the open state or the closed state of said separable contacts and electrically connected between the zone selective interlocking output of said one of said feeder circuit interrupters and the zone selective interlocking input of said at least one of said number of tie circuit interrupters;
a fourth diode including an anode electrically connected to the zone selective interlocking output of said different one of said feeder circuit interrupters and a cathode electrically connected to the zone selective interlocking input of said different second one of said main circuit interrupters; and
a second auxiliary contact having said state corresponding to the open state or the closed state of said separable contacts and electrically connected between the zone selective interlocking output of said different one of said feeder circuit interrupters and the zone selective interlocking input of said at least one of said number of tie circuit interrupters.

5. The power system of claim 1 wherein said circuit comprises:
a first auxiliary contact having a state corresponding to the open state or the closed state of said separable contacts and electrically connected between the zone selective interlocking output of said at least one of said number of tie circuit interrupters and the zone selective interlocking input of said first one of said main circuit interrupters;
a first electrical connection between the zone selective interlocking output of said at least one of said number of tie circuit interrupters and the zone selective interlocking input of said different second one of said main circuit interrupters;
a first diode including an anode electrically connected to the zone selective interlocking output of said one of said feeder circuit interrupters and a cathode electrically connected to the zone selective interlocking input of said first one of said main circuit interrupters;
a second auxiliary contact having said state corresponding to the open state or the closed state of said separable contacts and electrically connected between the zone selective interlocking output of said one of said feeder circuit interrupters and the zone selective interlocking input of said at least one of said number of tie circuit interrupters;
a second diode including an anode electrically connected to the zone selective interlocking output of said different one of said feeder circuit interrupters and a cathode electrically connected to the zone selective interlocking input of said different second one of said main circuit interrupters; and
a second electrical connection between the zone selective interlocking output of said different one of said feeder circuit interrupters and the zone selective interlocking input of said at least one of said number of tie circuit interrupters.

6. The power system of claim 1 wherein said circuit comprises:
a first electrical connection between the zone selective interlocking output of said at least one of said number of tie circuit interrupters and the zone selective interlocking input of said first one of said main circuit interrupters;
a first auxiliary contact having a state corresponding to the open state or the closed state of said separable contacts and electrically connected between the zone selective interlocking output of said at least one of said number of tie circuit interrupters and the zone selective interlocking input of said different second one of said main circuit interrupters;
a first diode including an anode electrically connected to the zone selective interlocking output of said one of said feeder circuit interrupters and a cathode electrically connected to the zone selective interlocking input of said first one of said main circuit interrupters;
a second electrical connection between the zone selective interlocking output of said one of said feeder circuit interrupters and the zone selective interlocking input of said at least one of said number of tie circuit interrupters;
a second diode including an anode electrically connected to the zone selective interlocking output of said different one of said feeder circuit interrupters and a cathode electrically connected to the zone selective interlocking input of said different second one of said main circuit interrupters; and
a second auxiliary contact having said state corresponding to the open state or the closed state of said separable contacts and electrically connected between the zone selective interlocking output of said different one of said feeder circuit interrupters and the zone selective interlocking input of said at least one of said number of tie circuit interrupters.

7. The power system of claim 1 wherein said circuit comprises:
a first auxiliary contact having a state corresponding to the open state or the closed state of said separable contacts and electrically connected between the zone selective interlocking output of said at least one of said number of tie circuit interrupters and the zone selective interlocking input of said first one of said main circuit interrupters;
a first electrical connection between the zone selective interlocking output of said at least one of said number of tie circuit interrupters and the zone selective interlocking input of said different second one of said main circuit interrupters;
a first diode including an anode electrically connected to the zone selective interlocking output of said one of said feeder circuit interrupters and a cathode electrically connected to the zone selective interlocking input of said first one of said main circuit interrupters;
a second electrical connection between the zone selective interlocking output of said one of said feeder circuit interrupters and the zone selective interlocking input of said at least one of said number of tie circuit interrupters;
a second diode including an anode electrically connected to the zone selective interlocking output of said different one of said feeder circuit interrupters and a cathode electrically connected to the zone selective interlocking input of said different second one of said main circuit interrupters; and
a second auxiliary contact having said state corresponding to the open state or the closed state of said separable contacts and electrically connected between the zone selective interlocking output of said different one of said feeder circuit interrupters and the zone selective interlocking input of said at least one of said number of tie circuit interrupters.

8. The power system of claim 1 wherein said circuit comprises:
a first electrical connection between the zone selective interlocking output of said at least one of said number of tie circuit interrupters and the zone selective interlocking input of said first one of said main circuit interrupters;
a first auxiliary contact having a state corresponding to the open state or the closed state of said separable contacts and electrically connected between the zone selective interlocking output of said at least one of said number of tie circuit interrupters and the zone selective interlocking input of said different second one of said main circuit interrupters;
a first diode including an anode electrically connected to the zone selective interlocking output of said one of said feeder circuit interrupters and a cathode electrically connected to the zone selective interlocking input of said first one of said main circuit interrupters;
a second auxiliary contact having said state corresponding to the open state or the closed state of said separable contacts and electrically connected between the zone selective interlocking output of said one of said feeder circuit interrupters and the zone selective interlocking input of said at least one of said number of tie circuit interrupters;
a second diode including an anode electrically connected to the zone selective interlocking output of said different one of said feeder circuit interrupters and a cathode electrically connected to the zone selective interlocking input of said different second one of said main circuit interrupters; and
a second electrical connection between the zone selective interlocking output of said different one of said feeder circuit interrupters and the zone selective interlocking input of said at least one of said number of tie circuit interrupters.

9. The power system of claim 1 wherein said circuit comprises:
a first diode including an anode electrically connected to the zone selective interlocking output of said at least one of said number of tie circuit interrupters and a cathode electrically connected to the zone selective interlocking input of said first one of said main circuit interrupters;
a second diode including an anode electrically connected to the zone selective interlocking output of said at least one of said number of tie circuit interrupters and a cathode electrically connected to the zone selective interlocking input of said different second one of said main circuit interrupters;
a third diode including an anode electrically connected to the zone selective interlocking output of said one of said feeder circuit interrupters and a cathode electrically connected to the zone selective interlocking input of said first one of said main circuit interrupters;
an auxiliary contact having a state corresponding to the open state or the closed state of said separable contacts and electrically connected between the zone selective interlocking output of said one of said number of feeder circuit interrupters and the zone selective interlocking input of said at least one of said number of tie circuit interrupters;
a fourth diode including an anode electrically connected to the zone selective interlocking output of said different one of said feeder circuit interrupters and a cathode electrically connected to the zone selective interlocking input of said different second one of said main circuit interrupters; and
an electrical connection between the zone selective interlocking output of said different one of said feeder circuit interrupters and the zone selective interlocking input of said at least one of said number of tie circuit interrupters.

10. The power system of claim 1 wherein said circuit comprises:
a first diode including an anode electrically connected to the zone selective interlocking output of said at least one of said number of tie circuit interrupters and a cathode electrically connected to the zone selective interlocking input of said first one of said main circuit interrupters;
a second diode including an anode electrically connected to the zone selective interlocking output of said at least one of said number of tie circuit interrupters and a cathode electrically connected to the zone selective interlocking input of said different second one of said main circuit interrupters;
a third diode including an anode electrically connected to the zone selective interlocking output of said one of said feeder circuit interrupters and a cathode electrically connected to the zone selective interlocking input of said first one of said main circuit interrupters;
an electrical connection between the zone selective interlocking output of said one of said feeder circuit interrupters and the zone selective interlocking input of said at least one of said number of tie circuit interrupters;
a fourth diode including an anode electrically connected to the zone selective interlocking output of said different one of said feeder circuit interrupters and a cathode electrically connected to the zone selective interlocking input of said different second one of said main circuit interrupters; and
an auxiliary contact having a state corresponding to the open state or the closed state of said separable contacts and electrically connected between the zone selective interlocking output of said different one of said number of feeder circuit interrupters and the zone selective interlocking input of said at least one of said number of tie circuit interrupters.

11. The power system of claim 1 wherein said circuit comprises:
an auxiliary contact having a state corresponding to the open state or the closed state of said separable contacts and electrically connected between the zone selective interlocking output of said at least one of said number of tie circuit interrupters and the zone selective interlocking input of said first one of said main circuit interrupters;
an electrical connection between the zone selective interlocking output of said at least one of said number of tie circuit interrupters and the zone selective interlocking input of said different second one of said main circuit interrupters;
a first diode including an anode electrically connected to the zone selective interlocking output of said one of said feeder circuit interrupters and a cathode electrically connected to the zone selective interlocking input of said first one of said main circuit interrupters;
a second diode including an anode electrically connected to the zone selective interlocking output of said one of said feeder circuit interrupters and a cathode electrically connected to the zone selective interlocking input of said at least one of said number of tie circuit interrupters;

a third diode including an anode electrically connected to the zone selective interlocking output of said different one of said feeder circuit interrupters and a cathode electrically connected to the zone selective interlocking input of said different second one of said main circuit interrupters; and a fourth diode including an anode electrically connected to the zone selective interlocking output of said different one of said feeder circuit interrupters and a cathode electrically connected to the zone selective interlocking input of said at least one of said number of tie circuit interrupters.

12. The power system of claim 1 wherein said circuit comprises:

an electrical connection between the zone selective interlocking output of said at least one of said number of tie circuit interrupters and the zone selective interlocking input of said first one of said main circuit interrupters;

an auxiliary contact having a state corresponding to the open state or the closed state of said separable contacts and electrically connected between the zone selective interlocking output of said at least one of said number of tie circuit interrupters and the zone selective interlocking input of said different second one of said main circuit interrupters;

a first diode including an anode electrically connected to the zone selective interlocking output of said one of said feeder circuit interrupters and a cathode electrically connected to the zone selective interlocking input of said first one of said main circuit interrupters;

a second diode including an anode electrically connected to the zone selective interlocking output of said one of said feeder circuit interrupters and a cathode electrically connected to the zone selective interlocking input of said at least one of said number of tie circuit interrupters;

a third diode including an anode electrically connected to the zone selective interlocking output of said different one of said feeder circuit interrupters and a cathode electrically connected to the zone selective interlocking input of said different second one of said main circuit interrupters; and a fourth diode including an anode electrically connected to the zone selective interlocking output of said different one of said feeder circuit interrupters and a cathode electrically connected to the zone selective interlocking input of said at least one of said number of tie circuit interrupters.

13. The power system of claim 1 wherein said main circuit interrupters, said number of tie circuit interrupters and said feeder circuit interrupters are low voltage switchgear.

14. The power system of claim 2 wherein the second and fourth diodes are structured to eliminate communication between the zone selective interlocking output of said different one of said feeder circuit interrupters on a power bus powered by said different second one of said main circuit interrupters and said first one of said main circuit interrupters that powers a different power bus for said one of said feeder circuit interrupters.

15. The power system of claim 1 wherein said power system is configured as a Main-Tie-Main power system and includes two faults reported by two of said first one and said different second one of said main circuit interrupters, said at least one of said number of tie circuit interrupters, and said one and said different one of said feeder circuit interrupters.

16. The power system of claim 2 wherein said first, second, third, fourth, fifth and sixth diodes are discrete diodes within a common enclosure, on a printed circuit board, or within an integrated circuit.

17. The power system of claim 1 wherein said main circuit interrupters, said number of tie circuit interrupters and said feeder circuit interrupters are circuit breakers.

18. The power system of claim 1 wherein said at least one of said number of tie circuit interrupters normally has the open state of said separable contacts between the first and second terminals thereof.

19. The power system of claim 2 wherein the first and second diodes are electrically connected together in series with a first conductor of a two-wire twisted pair, said first conductor being electrically connected to the zone selective interlocking input of said first one of said main circuit interrupters.

20. The power system of claim 19 wherein a second conductor of the two-wire twisted pair is electrically connected to a ground or common.

21. The power system of claim 20 wherein each of said main circuit interrupters, said number of tie circuit interrupters and said feeder circuit interrupters further includes a terminal electrically connected to the second conductor of the two-wire twisted pair.

22. The power system of claim 2 wherein said first, second, third, fourth, fifth and sixth diodes are discrete diodes.

23. The power system of claim 2 wherein the second and fourth diodes prevent the zone selective interlocking output of said different one of said feeder circuit interrupters on a power bus powered by said different second one of said main circuit interrupters from being input by the zone selective interlocking input of said first one of said main circuit interrupters that powers a different power bus for said one of said feeder circuit interrupters.

* * * * *